United States Patent [19]
Aenchbacher

[11] Patent Number: 6,062,802
[45] Date of Patent: May 16, 2000

[54] PAVER INSTALLER

[76] Inventor: Gregory L. Aenchbacher, 2034 Atha Woods Dr., Monroe, Ga. 30655

[21] Appl. No.: 09/039,810

[22] Filed: Mar. 16, 1998

[51] Int. Cl.$^7$ ........................................................ B60P 3/00
[52] U.S. Cl. ............................ 414/490; 414/10; 414/455; 254/7 R; 187/237; 187/267; 280/63; 280/652
[58] Field of Search ................................. 414/10, 11, 12, 414/622, 490, 589, 444, 453, 455; 294/103.1, 119.1; 254/7 R, 7 C; 187/222, 237, 267; 280/652, 63

[56] References Cited

U.S. PATENT DOCUMENTS

| | | |
|---|---|---|
| Re. 25,691 | 12/1964 | Pelto . |
| 1,806,881 | 5/1931 | Remde ..................................... 414/622 |
| 2,626,176 | 1/1953 | Braun . |
| 2,799,417 | 7/1957 | Morrell ................................... 414/622 |
| 2,821,426 | 1/1958 | Hanner . |
| 2,903,147 | 9/1959 | Davis, Jr. . |
| 3,003,654 | 10/1961 | Pelto . |
| 3,257,018 | 6/1966 | Miles . |
| 3,953,048 | 4/1976 | Vincent et al. . |
| 4,714,393 | 12/1987 | Betts ........................................ 414/10 |
| 5,071,183 | 12/1991 | McDermott et al. . |
| 5,158,032 | 10/1992 | Pitt . |
| 5,263,811 | 11/1993 | Teffer . |

FOREIGN PATENT DOCUMENTS

| | | | |
|---|---|---|---|
| 3536429 | 4/1987 | Germany ................................ 414/427 |
| 133810 | 4/1960 | Russian Federation ............... 414/622 |
| 337356 | 5/1959 | Switzerland ........................... 414/622 |
| 729326 | 5/1955 | United Kingdom ..................... 414/10 |
| 2269806 | 2/1994 | United Kingdom ................... 414/490 |

*Primary Examiner*—Frank E. Werner
*Attorney, Agent, or Firm*—Womble Carlyle Sandridge & Rice, PLLC

[57] ABSTRACT

A paver installer (10) is described for receiving and carrying a paver from one location to another location. The paver installer has frame (12) comprising a pair of spaced apart frame members (18) and a longitudinal axis disposed between. To add strength, at least one brace member (24) is disposed between the frame members. Proximate the lower portion of the frame is a wheel assembly(26). So that pavers (62) can be place on pedestals (72) having varying heights above grade, the paver installer has a U-shaped platform (46) slidably mounted to the facing away from the wheel assembly. Substantially cylindrically shaped sleeves (54) are mounted to the platform which respectively slidably engage the frame members. To move the platform along the longitudinal axis, a self locking screw lift (34) is mounted to the at least one brace member and the platform. A shim (60) is provided on the platform to prevent damage to the paver and provide an adjustable fit.

13 Claims, 3 Drawing Sheets

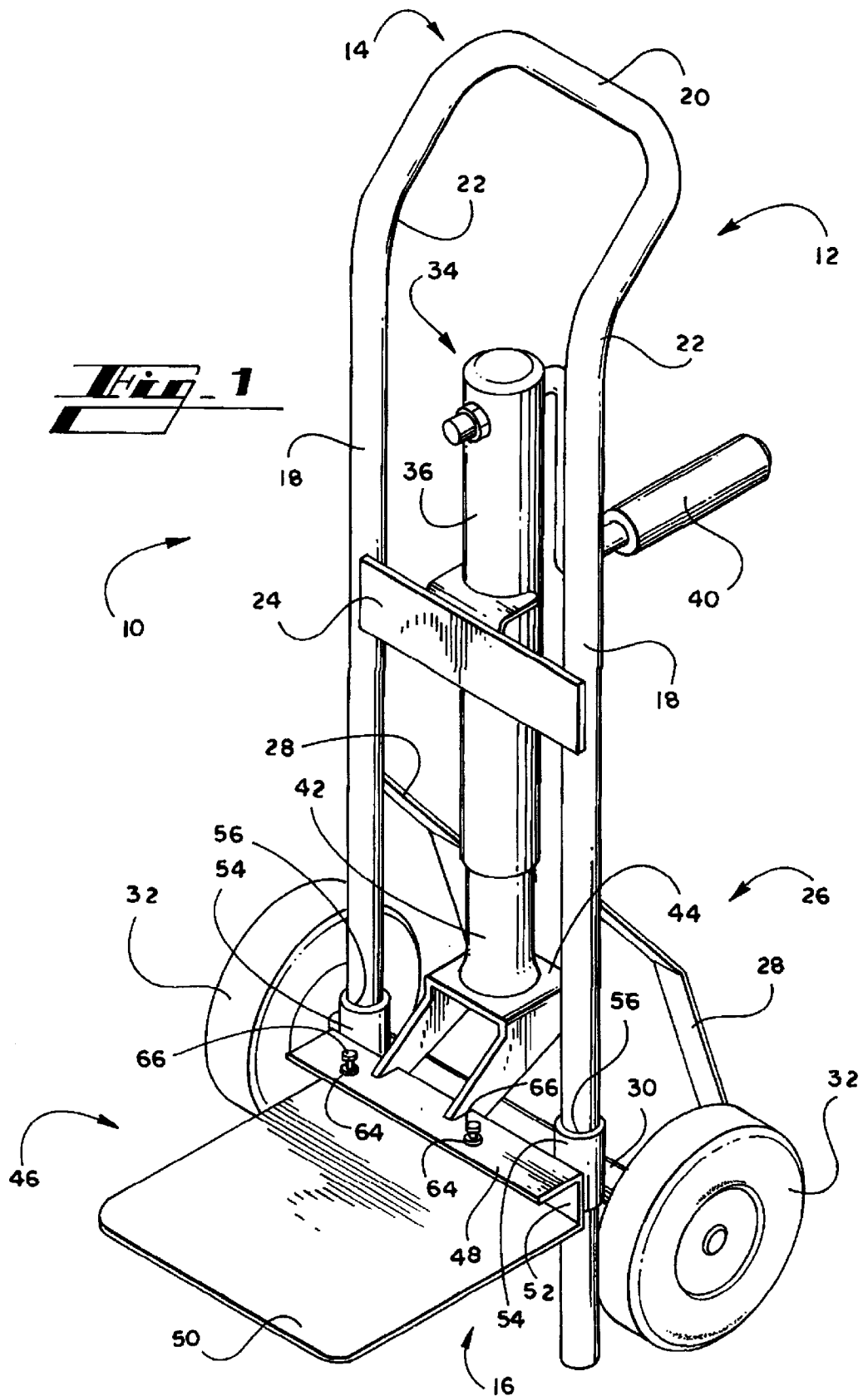
Fig_1

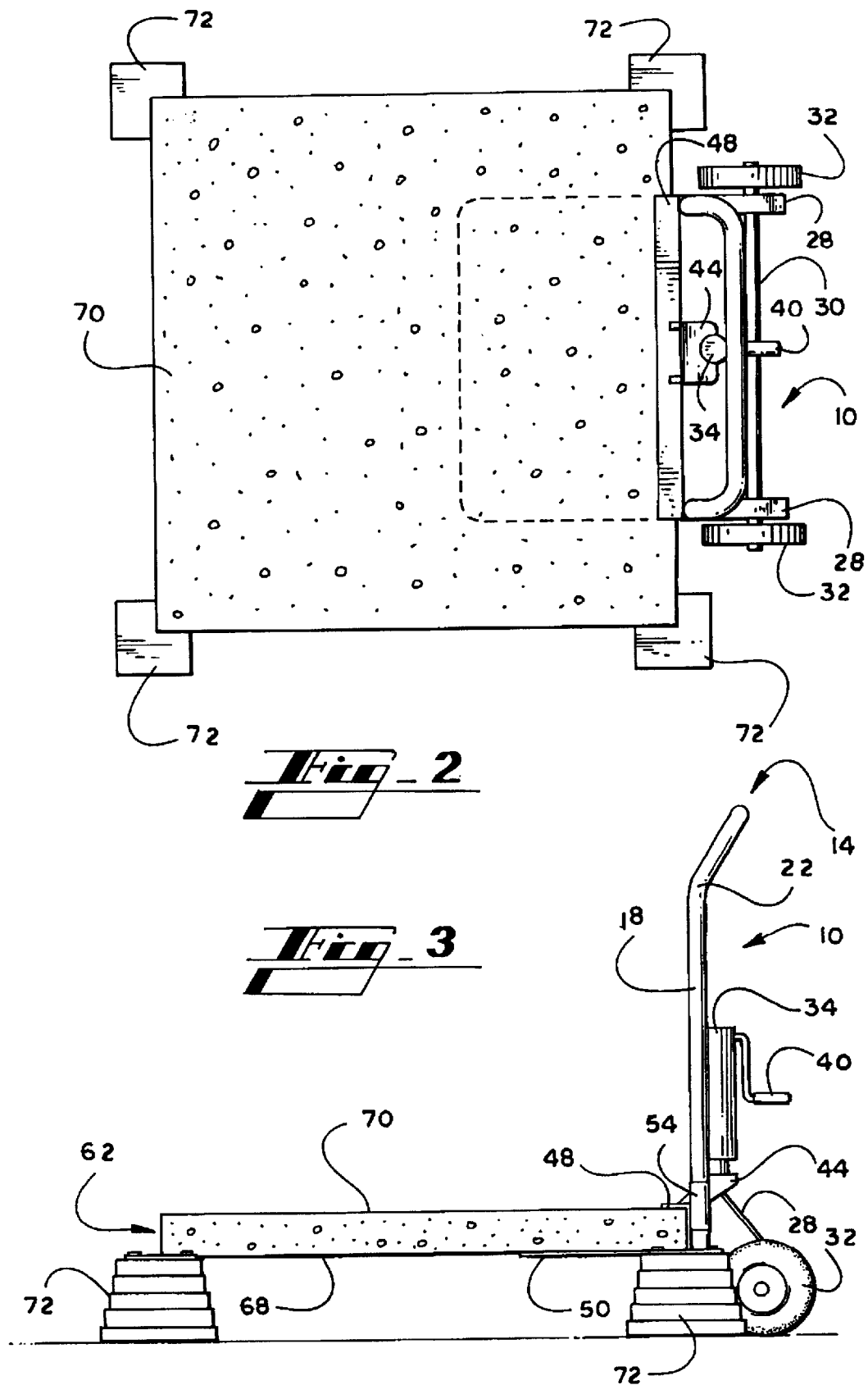

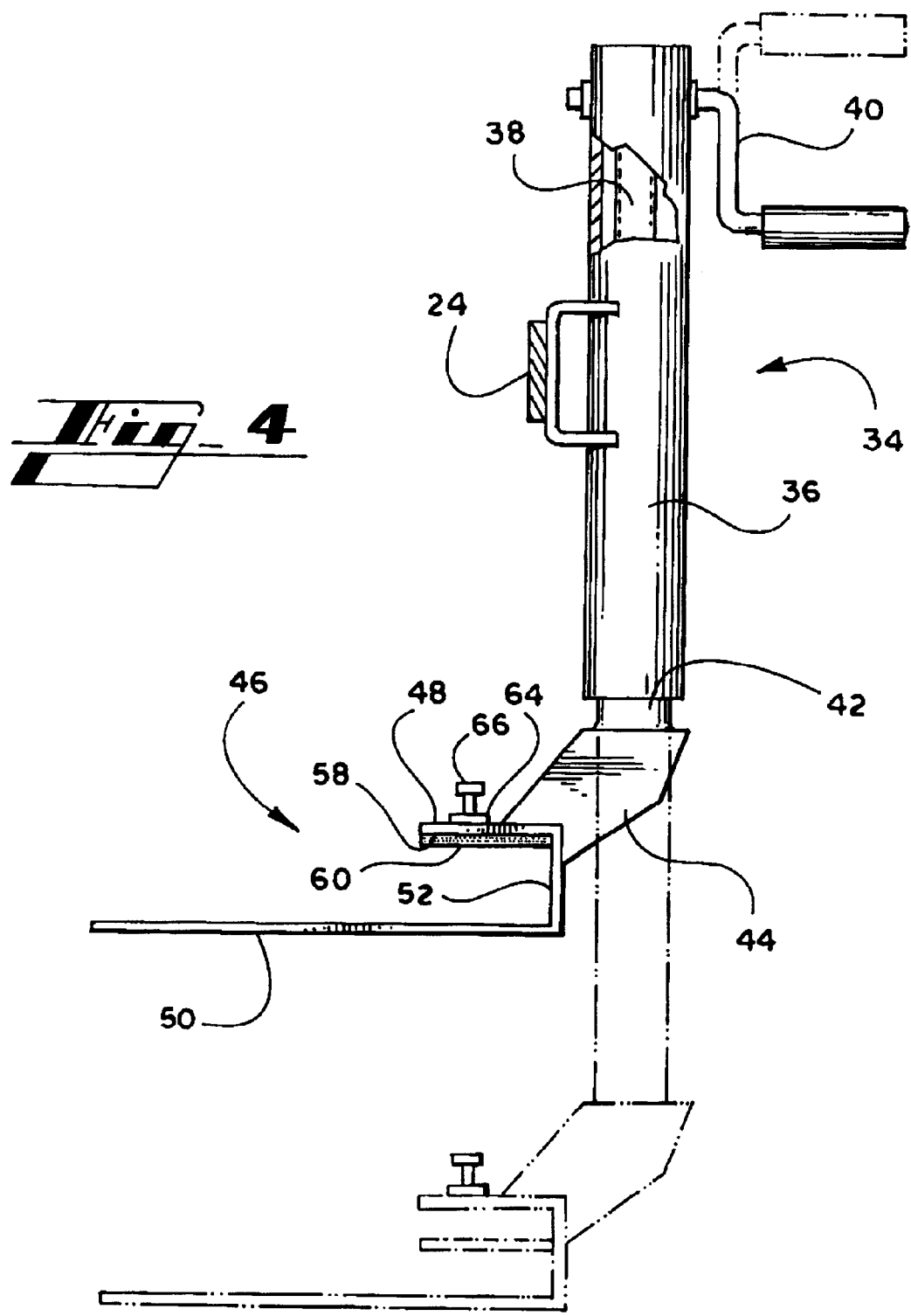

PAVER INSTALLER

BACKGROUND OF THE INVENTION

I. Field of the Invention

The present invention relates generally to the field of hand trucks. More particularly, the present invention relates to a hand truck capable of front loading, transporting and flushly depositing a paver onto pedestals.

II. Description of the Related Art

Concrete pavers are commonly utilized in the home and office construction industry to provide aesthetically pleasing patios, walkways, drives and the like. However, work crews are faced with the daunting task of moving the pavers from one location to another. Further complicating the crews efforts, often the terrain is not level and pedestals are utilized to compensate, thereby creating a level plane for the pavers.

Concrete pavers typically weigh 100 pounds or more. The current method is to have one or two workers utilize a tong-like device to pickup and carry the paver from one location to the installation site. Additionally, the worker is then required to place the paver onto the supporting pedestals simultaneously. Typically, one pedestal for each corner of the paver. Unfortunately, the worker can not walk on or disturb the last paver installed until the abutting pavers are installed, thereby locking the paver in place. As a result, the worker must work on grade and place the pavers successively from one edge and work outwardly therefrom. Therefore, any device requiring the worker to walk or roll the device on previously installed pavers prior to their being "locked in" is not feasible.

U.S. Patents issued to Pelto (U.S. Pat. Nos. Re. 25,691 and 3,003,654), Lockhart (U.S. Pat. No. 3,578,353), Horst (U.S. Pat. No. 3, 951,286), Mann (U.S. Pat. No. 5,251,922), and Gunlock et al. (U.S. Pat. No. 5,373,004) all describe hand trucks which have brackets moveably disposed along a frame. However, none of these devices is capable of controllably placing a paver onto pedestals.

Belko in U.S. Pat. No. 2,433,754 and Casey in U.S. Pat. No. 2,981,426 describe a hand truck for carrying concrete planks and like articles. These trucks utilize a reward facing bracket to engage the concrete planks. However, neither device is capable of depositing a planks onto all pedestals simultaneously. Importantly, neither device is capable of adjusting the height of the plank above grade. Both devices must roll over the previous course of planks installed, but prior to being locked in place.

SUMMARY OF THE INVENTION

In accordance with the present invention and the contemplated problems which have and continue to exist in this field, one of the objectives of this invention is to provide a paver installer which enables a single worker to easily transport heavy pavers from one location to another.

It is another object of the present invention to provide a U-shaped platform which is slidably mounted to frame members of the paver installer which provides controlled lifting, lowering and placement of a paver being held thereby.

Yet, it is another object of the present invention to provide a paver installer capable of transporting objects of varying dimension.

This invention accomplishes the above and other objectives and overcomes the disadvantages of the prior art by providing a paver installer that is simple in design and construction, inexpensive to fabricate, and easy to use. The paver installer has an elongated, vertical frame having a longitudinal axis and comprising a pair of spaced apart frame members. At least one brace member is disposed between the frame members. To facilitate movement, a wheel assembly is mounted to the lower portion of the frame. A U-shaped platform is slidably mounted to the frame for removably engaging the paver and adjusting the height of the paver above grade prior to installation. The platform has substantially cylindrically shaped sleeves mounted to the platform which slidably engage the frame members. A self locking screw lift is mounted to the at least one brace member and the platform for providing controlled movement of the platform along the longitudinal axis.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof Such description makes reference to the annexed drawings wherein:

FIG. 1 is a perspective view of a paver installer made in accordance with the present invention;

FIG. 2 is a top view of the paver installer engaging a paver;

FIG. 3 is a side elevation view of the paver installer flushly depositing the paver onto pedestals; and FIG. 4 is a partial, sectional side elevation view of a screw lift and a platform indicating vertical motion of the platform.

The reference numbers in the drawings relate to the following:

10=paver installer
12=frame
14=upper end of frame
16=lower end of frame
18=frame member
20=hand bar
22=bend of frame member
24=brace member
26=wheel assembly
28=wheel brace
30=axle
32=wheel
34=screw lift
36=housing
38=screw drive shaft
40=handle
42=drive cylinder
44=support 46=platform
48=top plate
50=bottom plate
52=rear plate
54=sleeve
56=bore of sleeve
58=lower surface of top plate
60=shim
62=paver
64=fitting
66=thumb screw
68=paver bottom
70=paver top
72=pedestal

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a paver installer 10 made in accordance with the present invention.

The paver installer 10 has an elongated, vertical frame 12, preferably made from a continuous tubular material, having an upper end 14 and a lower end 16. The frame 12 forms a pair of spaced apart frame members 18 which are substantially parallel to one another. Proximate the upper end 14 of the frame 12 is a hand bar 20, and preferably each frame member 18 has a bend 22 proximate the hand bar 20 to provide enhanced lifting leverage. Disposed substantially parallel to and between the frame members 18, the frame 12 has a longitudinal axis. Between the upper and lower ends 14 and 16 is at least one brace member 24 which is mounted to the respective frame members 18, adding structural strength to the frame 12. The brace member 24 extends substantially perpendicular between the frame members 18.

Mounted proximate the lower end 16 of the frame 12 is a wheel assembly 26. The wheel assembly comprises a wheel brace 28 extending outwardly and downwardly from each frame member 18. Mounted respectively to the wheel braces 28 is an axle 30. Rotatably mounted to each end of the axle 30 is a wheel 32. As shown in FIGS. 1–3, the wheels 32 are disposed away from and behind the frame 12.

With continued reference to FIGS. 1–3, and additionally to FIG. 4, a screw lift 34 is mounted to the at least one brace member 24 along the longitudinal axis. The screw lift 34 has a housing 36, and dispose within the housing is a screw drive shaft 38. To actuate the screw drive shaft 38 is a handle 40, which is operably connected to the screw drive shaft 38 and rotatably mounted to the housing 36 proximate the upper end 14 of the frame 12. Since the screw lift 34 utilizes a screw drive shaft 38, the screw lift is self locking, thereby resisting movement absent rotation of the handle 40. Extending outwardly from the housing 36 toward the lower end 16 of the frame 12 is a drive cylinder 42. The drive cylinder 42 is operably connected to the screw drive shaft 38 so at the handle 40 is rotated in one direction the drive cylinder 42 moves outwardly from the housing 36, and as the handle 40 is rotated in the other direction the drive cylinder 42 moves into the housing 36. Movement of the drive cylinder 42 is along the longitudinal axis. Attached to the drive cylinder 42 is a support 44.

A U-shaped platform 46 is slidably mounted to the frame 12 and attached to the support 44 of the screw lift 34, thereby enabling the platform 46 to move along the longitudinal axis. The platform 46 has a top plate 48, a bottom plate 50 and a rear plate 52 disposed between the top and bottom plates 48 and 50. As shown on FIG. 1, the platform 46 is disposed on the opposite side of the frame 12 as the wheel assembly 26 so that the platform faces away from the wheel assembly. Mounted on the rear plate 52 are a pair of spaced apart, substantially cylindrically shaped sleeves 54, each of which having a bore 56 therethrough. The sleeves 54 slidably engage the respective frame members by disposing the respective frame members 18 through the bores 56.

Now, referring to FIG. 4, the top plate 48 has a lower surface 58. Mounted to the lower surface 58 is a shim 60. The shim 60 is made from a padded or resilient material to provide a relatively snug fit for and prevent marking or damaging of objects, such as a paver 62, placed into the platform 46. Preferably, the shim 60 is adjustably mounted to the lower surface 58 to enable the worker to varying the distance between the shim 60 and the lower plate 50. In this manner the paver installer 10 is capable of transporting objects of varying dimension. In one embodiment, the top plate 48 has a pair of threaded fittings 64 extending therethrough and a thumb screw 66 respectively disposed therein. The thumb screws 66 are operably mounted to the shim 60, whereby rotation of the thumb screws 66 in one direction causes the shim 60 to move away from the top plate 48, and rotation in the opposite direction causes the shim 60 to move toward the top plate 48.

With particular reference to FIGS. 2 and 3, the paver installer 10 is shown engaging the paver 62, which has a paver bottom 68 and a paver top 70. In operation, the worker slidably engages the lower plate 50 with the paver bottom 68 and contacts the rear plate 52 with the paver 62. The shim 60 is placed in contact with the paver top 70. Then, the worker tilts the paver installer 10, thereby lifting the paver 62, and transports the paver 62 to the desired location. Often, the paver 62 is to be placed upon prearranged pedestals 72 which have a predetermined, but variable, height above grade. Importantly, for proper installation the paver 62 should be place on all pedestals simultaneously. Since the platform 46 is capable of moving along the longitudinal axis by rotating the handle, the worker can adjust the height of the paver 62 above grade and controllably lower the paver 62 onto the pedestals 72.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A paver installer for receiving and carrying a paver from one location to another location, comprising:

an elongated, vertical frame having a pair of spaced apart frame members and a longitudinal axis disposed between the frame members;

at least one brace member being disposed between the frame member;

a wheel assembly mounted to the frame in a position to support the paver installer upon tilting of the frame;

a U-shaped platform comprising a rear plate slidably mounted to the frame, a bottom plate mounted to the rear plate and extending outwardly with respect to the frame for supporting a paver bottom, a top plate mounted to the rear plate spaced apart from the bottom plate and extending outwardly with respect to the frame for engaging a paver top and holding the paver on the bottom plate; and an actuatable lift mounted to the at least one brace member and the platform for moving the platform along the longitudinal axis.

2. A paver installer as claimed in claim 1, wherein the platform has at least one substantially cylindrically shaped sleeve mounted to the platform proximate the rear plate, the at least one sleeve having a bore, and the bore slidably receiving one of the frame members.

3. A paver installer as claimed in claim 2, wherein the actuatable lift is a screw lift having a screw drive shaft and an actuating handle rotatably and operably connected thereto.

4. A paver installer as claimed in claim 3, wherein the screw lift is self locking.

5. A paver installer as claimed in claim 1, wherein the actuatable lift is a screw lift having a screw drive shaft and an actuating handle rotatably and operably connected thereto.

6. A paver installer as claimed in claim 5, wherein the screw lift is self locking.

7. A paver installer as claimed in claim 1, wherein the top plate has a lower surface and further comprises a shim adjustably mounted to the lower surface for varying the distance between the shim and the lower plate.

8. A paver installer as claimed in claim 7, wherein the shim is padded.

9. A paver installer as claimed in claim 7, wherein the shim comprises a resilient material.

10. A paver installer for receiving and carrying a paver from one location to another location, comprising:

an elongated, vertical frame having a pair of spaced apart frame members and a longitudinal axis disposed between the frame members;

at least one brace member being disposed between the frame members;

a wheel assembly mounted to the frame in a position to support the paver installer upon tilting of the frame;

a U-shaped platform comprising at lease one sleeve slidably engaging the frame, a rear plate mounted to the at least one sleeve, a bottom plate mounted to the rear plate and extending outwardly with respect to the frame for supporting a paver bottom, a top plate mounted to the rear plate space apart from the bottom plate and extending outwardly with respect to the frame for engaging a paver top to hold the paver; and a self locking screw lift mounted to the at least one brace member and the platform for moving the platform along the longitudinal axis, the screw lift having a screw drive shaft and an actuating handle rotatably and operably connected thereto.

11. A paver installer as claimed in claim 10, wherein the top plate has a lower surface and further comprises a shim adjustably mounted to the lower surface for varying the distance between the shim and the lower plate.

12. A paver installer as claimed in claim 11, wherein the shim is padded.

13. A paver installer as claimed in claim 11, wherein the shim comprises a resilient material.

* * * * *